US011920391B2

(12) United States Patent
Zylstra et al.

(10) Patent No.: US 11,920,391 B2
(45) Date of Patent: Mar. 5, 2024

(54) HINGE COVERS FOR EXPOSED VEHICLE DOOR HINGES

(71) Applicant: Dee Zee, Inc., Des Moines, IA (US)

(72) Inventors: Bart Zylstra, Pleasant Hill, IA (US); Joshua Knichel, Altoona, IA (US); Bryce Rustwick, Clive, IA (US); Eric Schuling, Bondurant, IA (US)

(73) Assignee: Dee Zee, Inc., Des Moines, IA (US)

( * ) Notice: Subject to any disclaimer, the term of this patent is extended or adjusted under 35 U.S.C. 154(b) by 0 days.

(21) Appl. No.: 17/942,255

(22) Filed: Sep. 12, 2022

(65) Prior Publication Data

US 2023/0079626 A1 Mar. 16, 2023

Related U.S. Application Data

(60) Provisional application No. 63/242,881, filed on Sep. 10, 2021.

(51) Int. Cl.
*E05D 15/00* (2006.01)
*E05D 11/00* (2006.01)

(52) U.S. Cl.
CPC ..... *E05D 11/0054* (2013.01); *E05Y 2900/531* (2013.01)

(58) Field of Classification Search
CPC ................ E05D 11/06; E05D 11/0054; E05D 2011/0063; E05D 2011/0072; E05D 3/122; E05D 1/00; E05D 5/06; E05D 7/009; E05D 3/02; E05C 17/54; E05Y 2900/132; E05Y 2900/502; E05Y 2900/531; E05Y 2600/46; E05Y 2600/41; E05Y 2201/484; E05Y 2201/496; E05Y 2201/10; E05Y 2201/11; Y10T 16/533; Y10T 16/5335; Y10T 16/541; Y10T 16/542; Y10T 16/5388; E05F 1/1215; B64C 1/1461
See application file for complete search history.

(56) References Cited

U.S. PATENT DOCUMENTS

| | | | | |
|---|---|---|---|---|
| 3,422,486 A * | 1/1969 | Henry, Jr. | E05D 11/0054 | 16/251 |
| 4,570,291 A * | 2/1986 | Smith | E05D 11/0054 | 403/228 |
| 4,761,852 A * | 8/1988 | Sauber | E05D 5/043 | 16/382 |
| 5,198,031 A * | 3/1993 | Derstine | B05B 12/20 | 118/301 |
| 6,735,821 B1 * | 5/2004 | Christman, Jr. | E05D 11/0054 | 16/250 |
| 8,491,043 B2 | 7/2013 | Yamagishi et al. | | |
| 8,602,487 B2 | 12/2013 | Tanaka et al. | | |

(Continued)

FOREIGN PATENT DOCUMENTS

| | | | | |
|---|---|---|---|---|
| DE | 20218911 U1 * | 3/2003 | E05D 11/0054 |
| DE | 102018110188 B3 * | 5/2019 | |

(Continued)

*Primary Examiner* — Chuck Y Mah
(74) *Attorney, Agent, or Firm* — Dinsmore & Shohl LLP

(57) ABSTRACT

A door hinge sized and configured to cover at least one door hinge of a vehicle includes a cover body that at least partially surrounds the at least one door hinge when connected to a pillar of the vehicle. The cover body includes fastening locations that are located to align with fastening location on the pillar for fastening the hinge cover in place.

17 Claims, 6 Drawing Sheets

(56) References Cited

U.S. PATENT DOCUMENTS

| | | | | |
|---|---|---|---|---|
| 9,045,167 | B2 | 6/2015 | Watanabe et al. | |
| 9,303,437 | B1 | 4/2016 | Holmes et al. | |
| 9,435,151 | B2 | 9/2016 | Tanabe | |
| 9,701,259 | B2 | 7/2017 | Tanabe et al. | |
| 10,745,951 | B2 | 8/2020 | Wunderle et al. | |
| 11,028,626 | B2 | 6/2021 | Mayville et al. | |
| 11,047,158 | B2 * | 6/2021 | Watanabe | E05F 1/1215 |
| 2008/0295286 | A1 * | 12/2008 | Falato | E05D 11/0054<br>16/250 |
| 2010/0088850 | A1 * | 4/2010 | Dringenberg | E05D 11/0054<br>16/251 |
| 2019/0032383 | A1 * | 1/2019 | Wilks | E05D 5/0207 |
| 2021/0122300 | A1 | 4/2021 | Molyneux et al. | |
| 2021/0123276 | A1 | 4/2021 | Molyneux et al. | |

FOREIGN PATENT DOCUMENTS

| | | | | |
|---|---|---|---|---|
| JP | 2001277856 | A | * | 10/2001 |
| JP | 2007315013 | A | * | 12/2007 |
| JP | 2016108880 | A | * | 6/2016 |
| KR | 970043921 | A | * | 7/1997 |
| WO | 2020196544 | A1 | | 10/2020 |

* cited by examiner

HINGE COVERS FOR EXPOSED VEHICLE DOOR HINGES

CROSS-REFERENCE TO RELATED APPLICATION

This application claims the benefit of U.S. Provisional Patent Application No. 63/242,881 filed Sep. 10, 2022, hereby incorporated by reference in its entirety.

TECHNICAL FIELD

The present specification generally relates to vehicle door assemblies and, more specifically, to hinge covers for vehicle door hinges that have been exposed due to removal of the vehicle doors.

BACKGROUND

Some vehicle have doors that are intended to be removed easily by the operator. For example, certain JEEP and FORD models have such vehicles with removable vehicle doors. Once the doors are removed, the components connecting the doors to the vehicle frames are exposed, such as the door hinges. It may be desirable for some vehicle operators to easily hide or cover those exposed components.

SUMMARY

In one embodiment, a door hinge cover sized and configured to cover at least one door hinge of a vehicle includes a cover body that at least partially surrounds the at least one door hinge when connected to a pillar of the vehicle. The cover body includes fastening locations that are located to align with fastening location on the pillar for fastening the hinge cover in place.

In another embodiment, a door hinge cover includes a cover body sized and configured to cover at least one door hinge of a vehicle such that the cover body at least partially surrounds the at least one door hinge when connected to a pillar of the vehicle. The cover body includes a fastening location that is located to align with a fastening location on the pillar for fastening the hinge cover in place with a door removed from the vehicle.

In another embodiment, a method of covering a door hinge of a vehicle with a vehicle door removed is provided. The method includes covering at least one door hinge with a door hinge cover including a cover body sized and configured to cover the at least one door hinge of the vehicle such that the cover body at least partially surrounds the at least one door hinge when connected to a pillar of the vehicle. The cover body includes a fastening location that is located to align with a fastening location on the pillar for fastening the hinge cover in place with a door removed from the vehicle. The door hinge cover is fastened to the pillar at the fastening location of the cover body and the fastening location on the pillar In another embodiment, a kit including hinge covers that are sized and configured to cover door hinges of a vehicle with vehicle doors removed. The kit includes a first hinge cover comprising a first cover body sized and configured to cover a first door hinge of a vehicle such that the first cover body at least partially surrounds the door hinge when connected to a first pillar of the vehicle. A second hinge cover includes a second cover body sized and configured to cover a second door hinge of the vehicle such that the second cover body at least partially surrounds the second door hinge when connected to a second pillar of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to hinge covers for vehicles that can be placed over the door hinges when a vehicle door is removed and then connected to the door frame thereby covering the door hinges.

Figure 1:
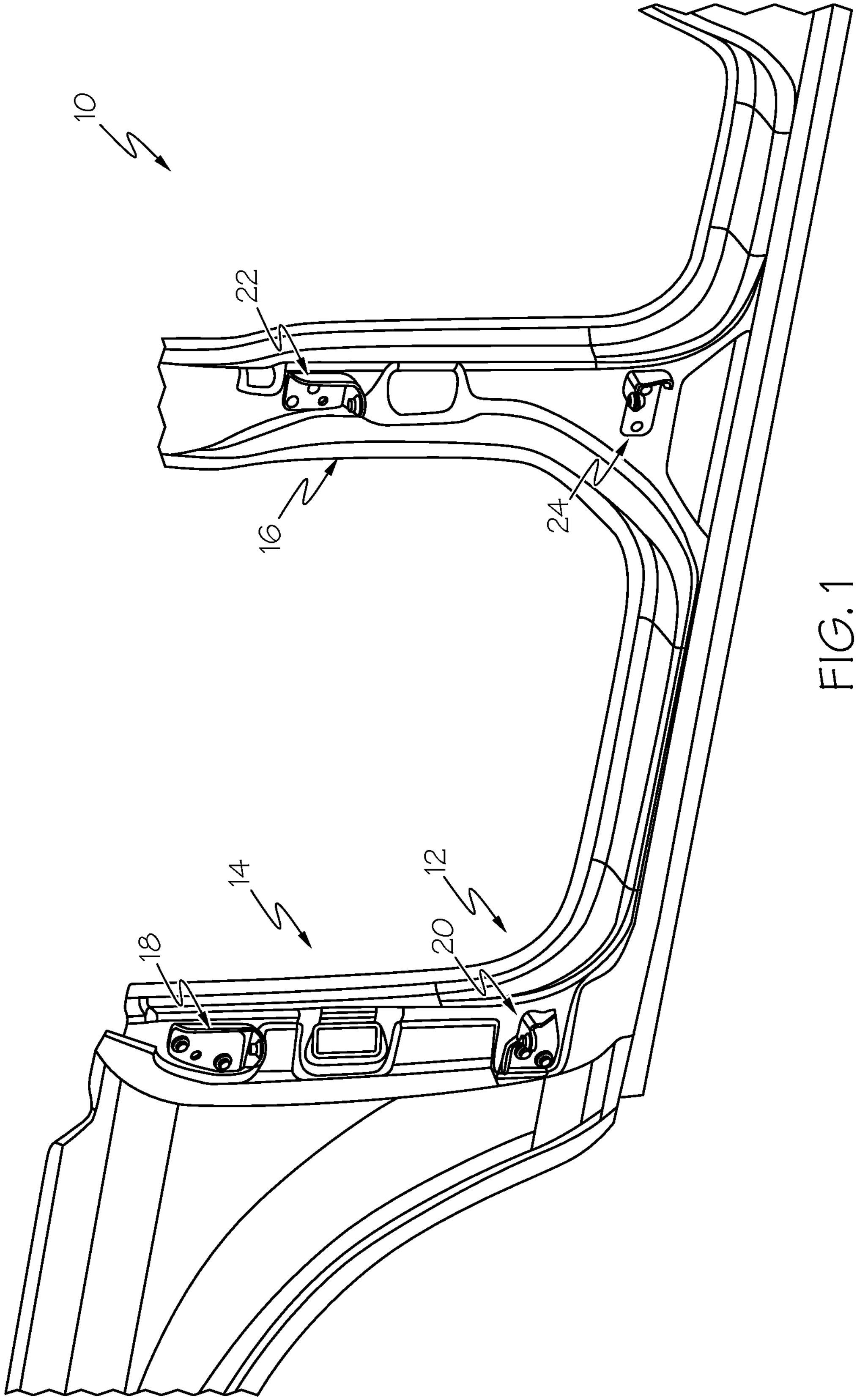
FIG. 1 depicts a side view of a vehicle body and door frame with a vehicle door removed exposing door hinges, according to one or more embodiments shown and described herein.
Figure 2:
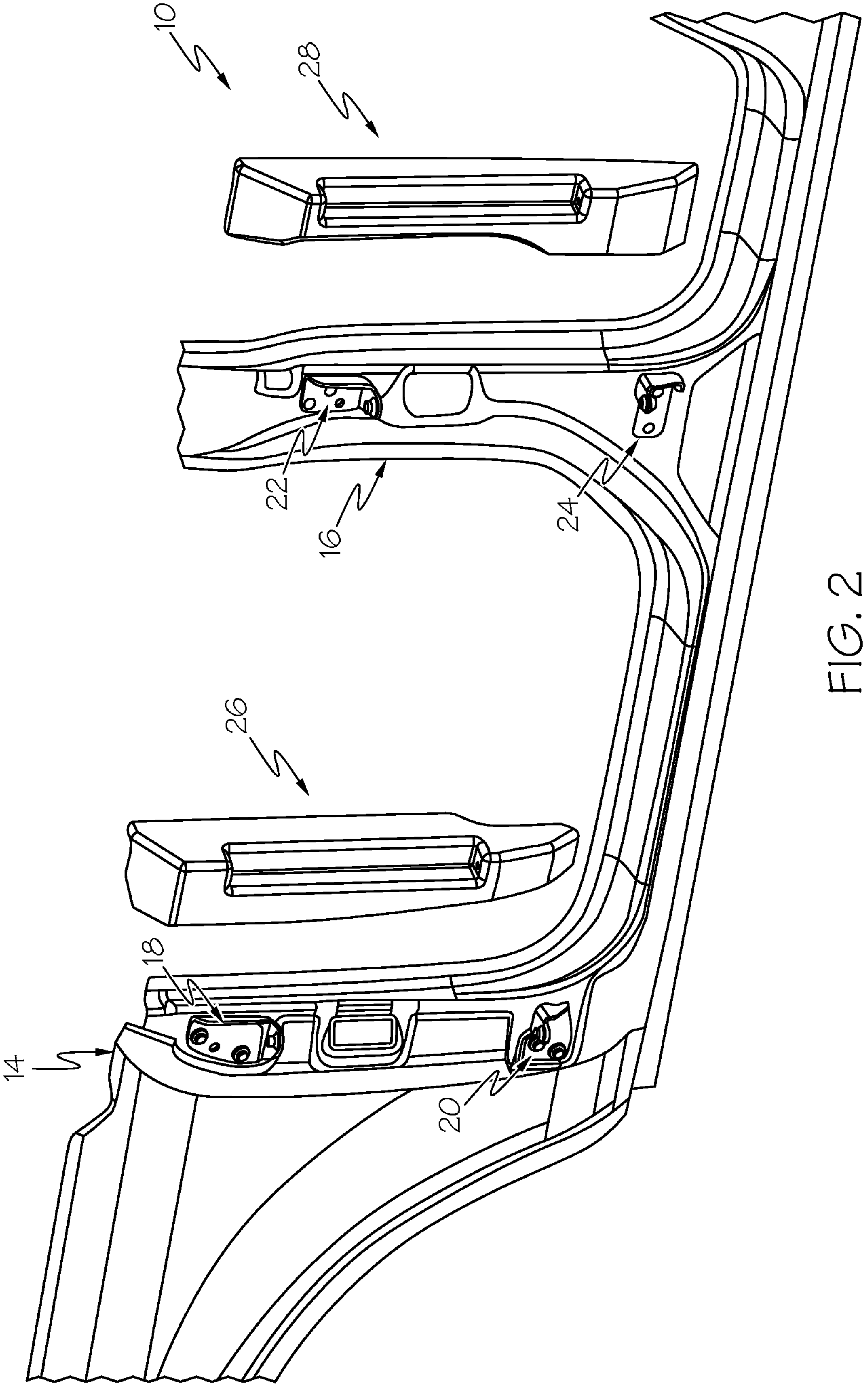
FIG. 2 depicts the door frame and hinge covers removed from the door frame, according to one or more embodiments shown and described herein.
Figure 3:
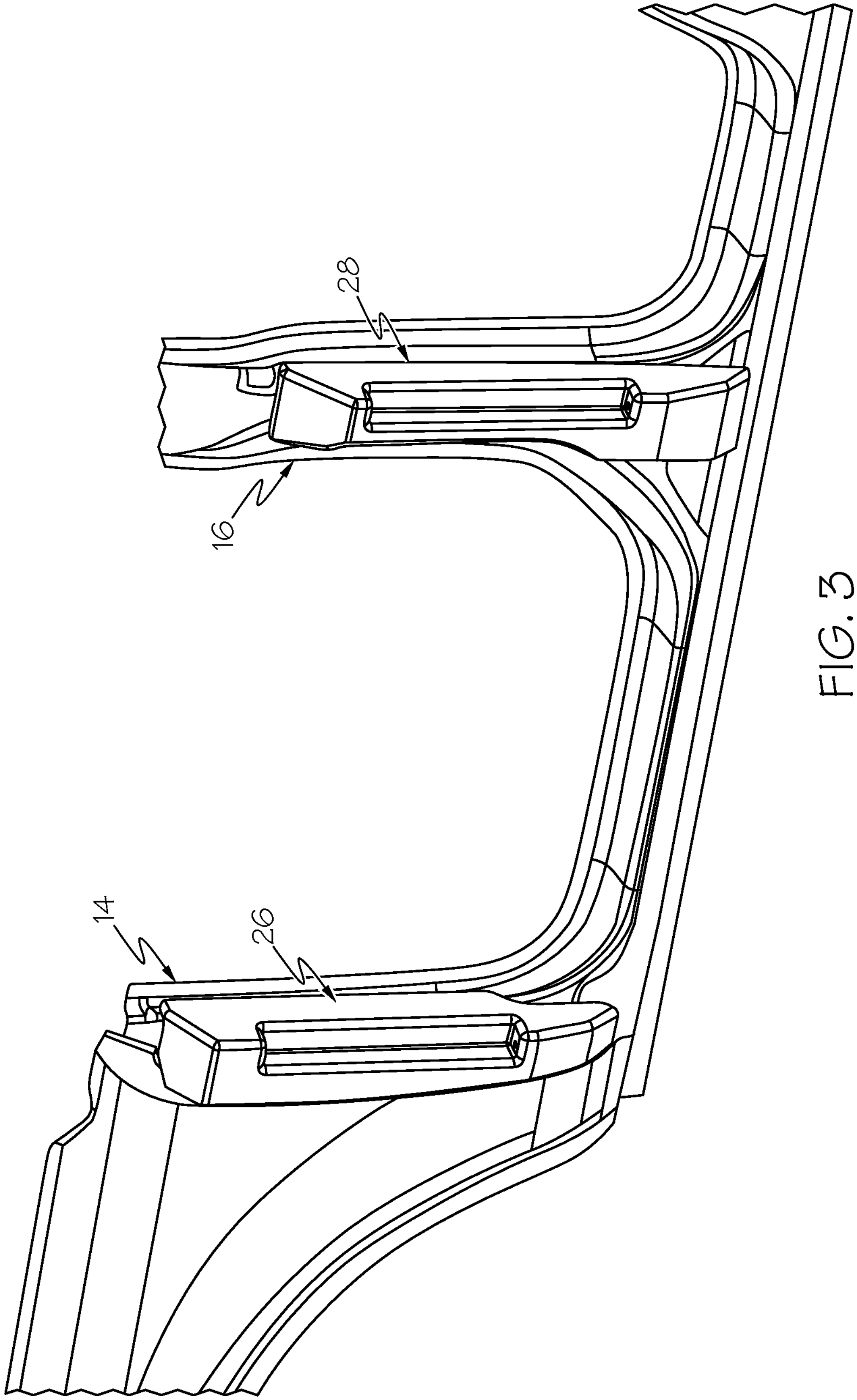
FIG. 3 depicts the door frame and hinge covers connected to the door frame covering the door hinges, according to one or more embodiments shown and described herein.
Figure 5:
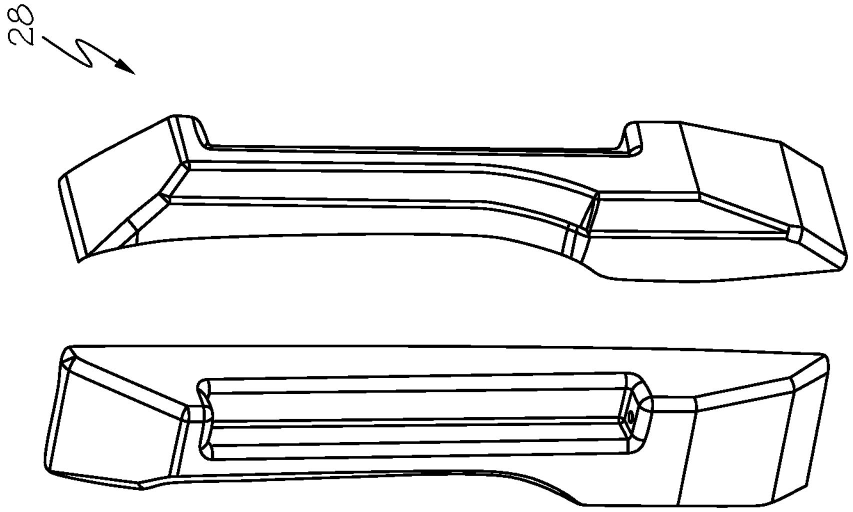
FIGS. 4 and 5 show front and side views of the door hinges in isolation, according to one or more embodiments shown and described herein.
Figure 4:
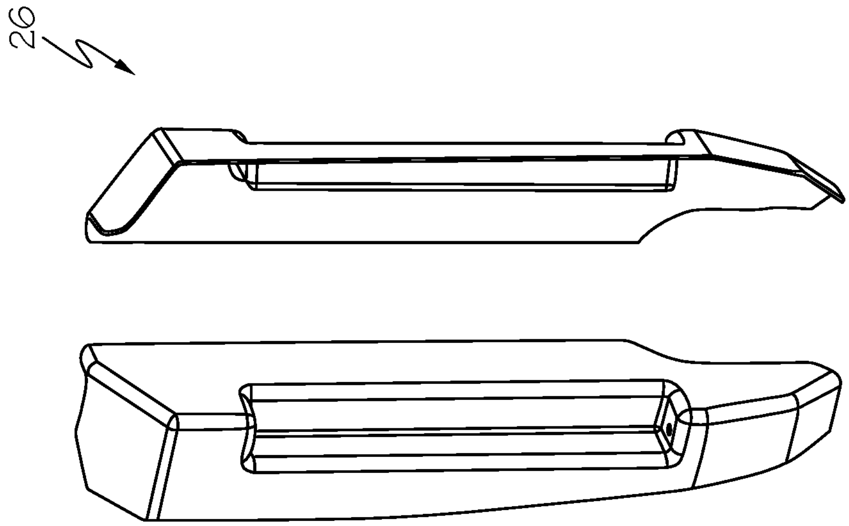
Figure 6:
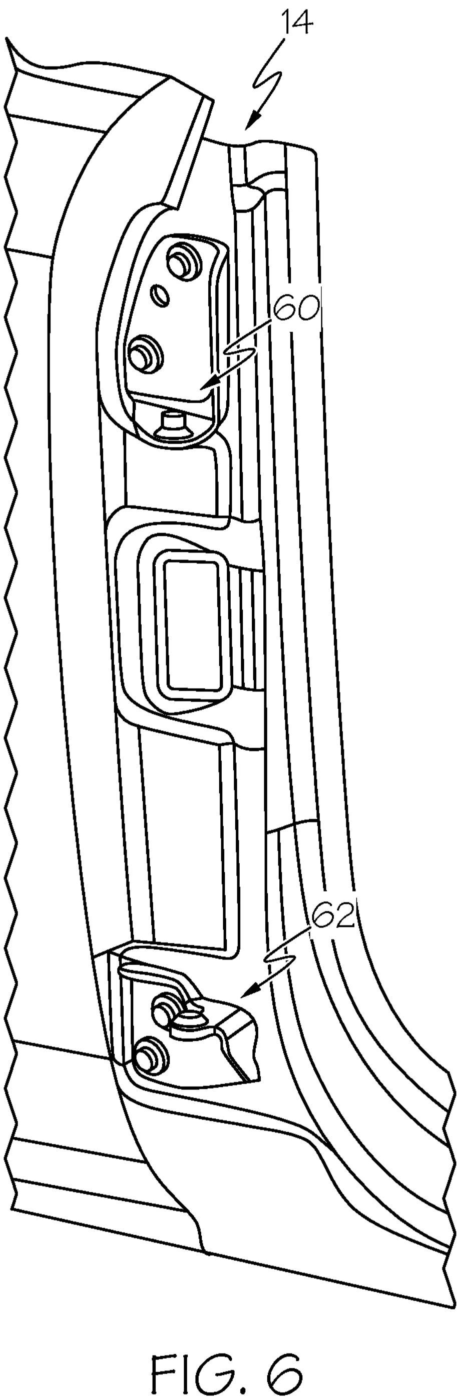
FIGS. 6 and 7 show a more detailed view of an A-pillar of the vehicle door frame with door hinges exposed (FIG. 6) and with door hinges covered by the hinge cover (FIG. 7), according to one or more embodiments shown and described herein.

Referring to FIG. 1, a vehicle body 10 of a vehicle is illustrated that includes a door frame 12 including an A-pillar 14 and a B-pillar 16. The vehicle doors (not shown) have been removed. In some vehicles, the vehicles may be manufactured such that the vehicle doors can be easily removed; however, it may be possible to remove vehicle doors that are not intended to be easily removed by their owners.

Removal of the vehicle doors exposes door hinges 18, 20, 22 and 24. Hinges 18 and 20 are located on the A-pillar 14 and door hinges 22 and 24 are located on the B-pillar 16. As can be appreciated, exposing the door hinges 18, 20, 22 and 24 can expose the door hinges to debris, such as sand, mud, etc., may be aesthetically displeasing and can expose metal edges. In any event, there may be a desire to provide a covering for the door hinges 18, 20, 22 and 24.

Referring to FIGS. 2-5, to this end, hinge covers 26 and 28 are provided that can be used to cover the door hinges 18, 20, 22 and 24. The hinge covers 26 and 28 are shaped and dimensioned to be mounted to their respective pillar 14, 16. In particular, hinge cover 26 is shaped and dimensioned to be mounted to the A-pillar 14 and the hinge cover 28 is shaped and dimensioned to be mounted to the B-pillar 16. In the illustrated embodiment, the hinge covers 26 and 28 are sized to cover both of their respective door hinges 18, 20 and 22, 24. In other embodiments, the hinge covers 26 and 28 may be sized to cover only a single door hinge. In this regard, it may be possible to have multiple hinge covers per pillar.

Referring particularly to FIGS. 6-9, the hinge covers 26 and 28 include cover bodies 30 and 32, respectively. The cover bodies 30 and 32 include upper ends 34, 36, lower ends 38, 40, fronts 42, 44 and sides, 46, 48, 50 forming a rectangular U-shape in cross-section. Depending on the location (e.g., A or B-pillar), the cover bodies 30 and 32 may have different shapes and sizes. As can be seen, hinge cover 26 has a different shape than hinge cover 28.

Figure 7:
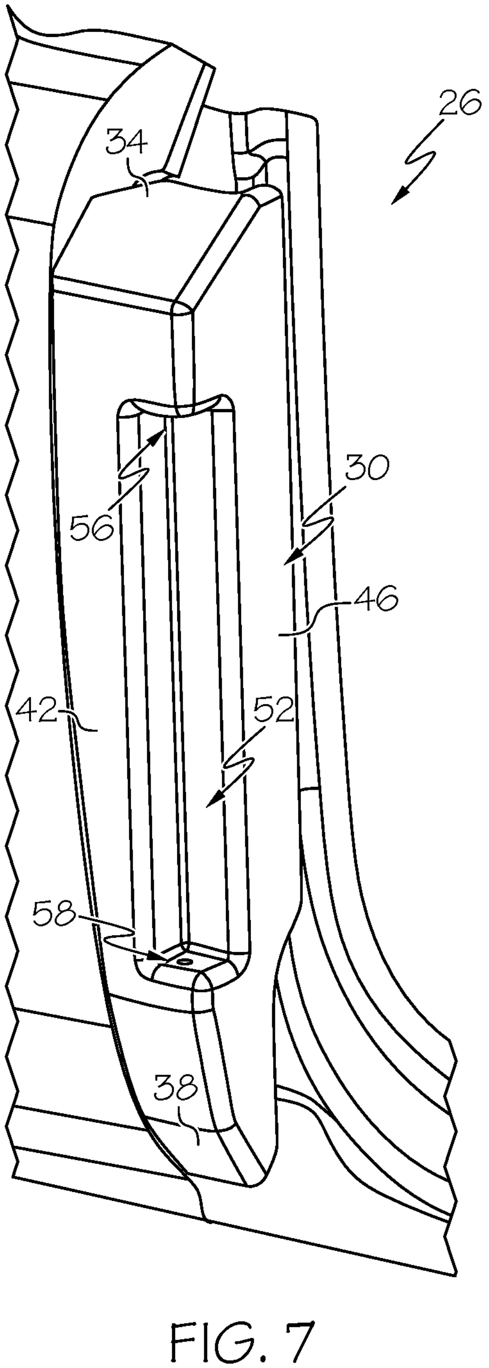
Figure 8:
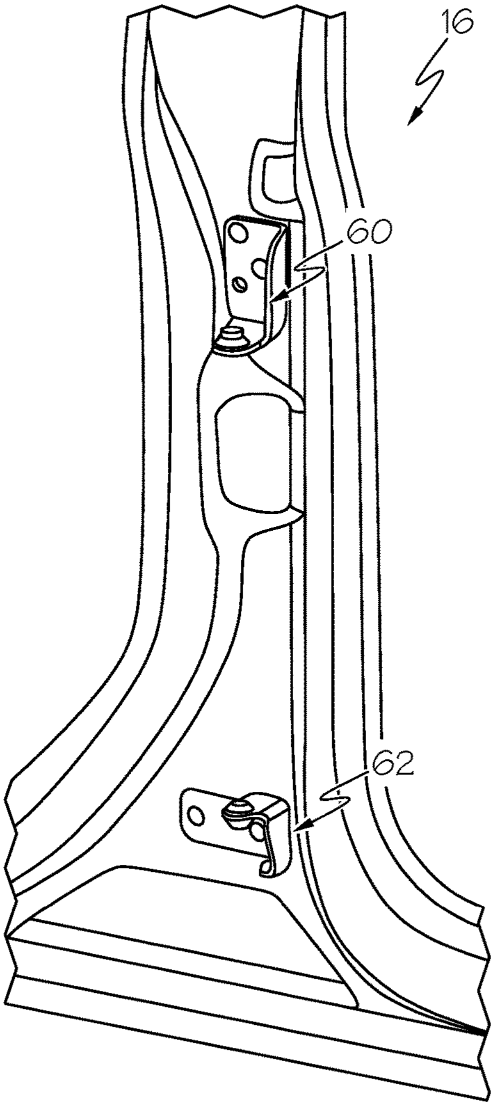
FIGS. 8 and 9 show a more detailed view of a B-pillar of the vehicle door frame with door hinges exposed (FIG. 8) and with door hinges covered (FIG. 9) by the hinge cover, according to one or more embodiments shown and described herein.
Figure 9:
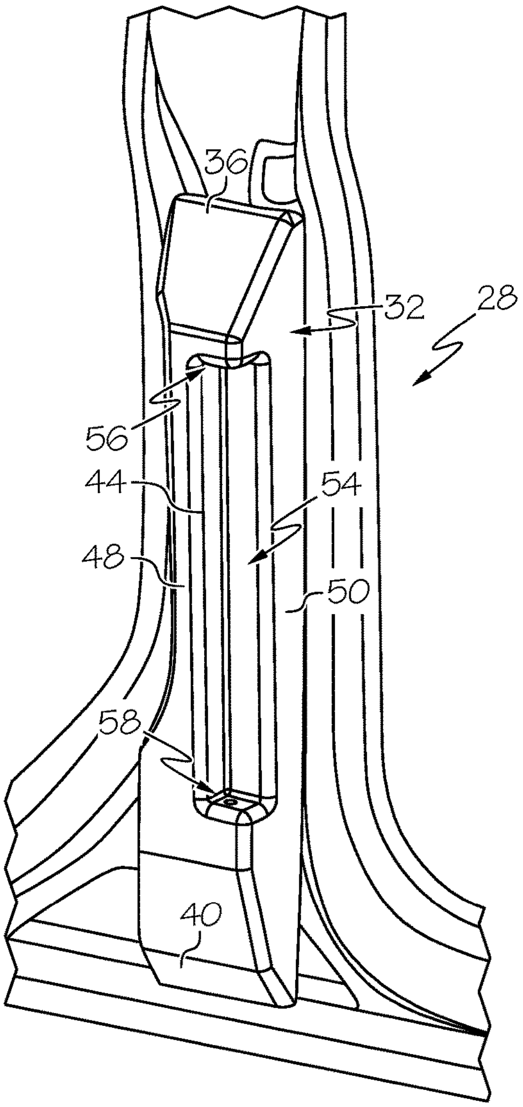

Both cover bodies 30 and 32 include a recess 52 and 54 that intersects the fronts 42, 44 and the sides 46, 50, respectively. The recesses 52 and 54 provide upper and lower fastening locations 56 and 58 that face one another and that can be used to connect the hinge covers to existing fastening locations 60 and 62 (see FIGS. 6 and 8) on the A and B-pillars 14 and 16. In some embodiments, the fastening locations 56 and 58 may align with hinge bolt locations of the upper and lower door hinges 18, 20, 22 and 24 for connecting using fasteners. As can be seen by FIGS. 7 and 9, once in place, the hinge covers 18, 20, 22 and 24 surround the upper and lower door hinges 18, 20, 22 and 24.

The hinge covers 26 and 28 can be formed of any suitable material, such as metal and/or plastic and can be formed using any suitable method, such as molding, machining, 3-D printing, forging, etc. The hinge covers 26 and 28 may be provided with coatings, seals, chrome, imprints (e.g., symbols, insignias, etc.), different colors, prints, patterns, images, logos etc.

The above-described hinge covers can be used to cover exposed door hinges once the vehicle door is removed. Such hinge covers can provide added protection for the door hinges from the elements, debris, contact, etc. The hinge covers may be packaged as a kit along with fasteners and instructions for assembly for mounting to the pillars. The kit can have multiple ones of the hinge covers, such as two, four, six, etc. for covering multiple door assemblies, such as all the door assemblies that have removed vehicle doors.

It is noted that the terms “substantially” and “about” may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Embodiments can be described with reference to the following numbered clauses, with certain features laid out in the dependent clauses:

Clause 1: A door hinge cover comprising: a cover body sized and configured to cover at least one door hinge of a vehicle such that the cover body at least partially surrounds the at least one door hinge when connected to a pillar of the vehicle, the cover body comprising a fastening location that is located to align with a fastening location on the pillar for fastening the hinge cover in place with a door removed from the vehicle.

Clause 2: The door hinge cover of clause 1, wherein the cover body is sized and configured to cover an upper door hinge and a lower door hinge of a vehicle such that the cover body at least partially surrounds the upper door hinge and the lower door hinge when connected to the pillar of the vehicle.

Clause 3: The door hinge cover of clause 1 or 2, wherein the cover body has a recess that forms the fastening location of the cover body.

Clause 4: The door hinge cover of clause 3, wherein the cover body includes a front and a side, wherein the recess intersects the front and side.

Clause 5: The door hinge cover of clause 4, wherein the fastening location of the cover body is a first upper fastening location and the fastening location on the pillar is a second upper fastening location, the first upper fastening location is located to align with the second upper fastening location.

Clause 6: The door hinge cover of clause 5, wherein the recess forms a first lower fastening location that is located to align with a second lower fastening location on the pillar for fastening the hinge cover in place with the door removed from the vehicle.

Clause 7: A method of covering a door hinge of a vehicle with a vehicle door removed, the method comprising: covering at least one door hinge with a door hinge cover comprising a cover body sized and configured to cover the at least one door hinge of the vehicle such that the cover body at least partially surrounds the at least one door hinge when connected to a pillar of the vehicle, the cover body comprising a fastening location that is located to align with a fastening location on the pillar for fastening the hinge cover in place with a door removed from the vehicle; and fastening the door hinge cover to the pillar at the fastening location of the cover body and the fastening location on the pillar.

Clause 8: The method of clause 7, wherein the fastening location on the pillar is provided by the at least one door hinge.

Clause 9: The method of clause 7 or 8, wherein the at least one door hinge is an upper door hinge, the cover body is sized and configured to cover the upper door hinge and a lower door hinge of the vehicle such that the cover body at least partially surrounding the upper door hinge and the lower door hinge when connected to the pillar of the vehicle.

Clause 10: The method of any of clauses 7-9, wherein the cover body has a recess forming the fastening location of the cover body.

Clause 11: The method of clause 10, wherein the cover body includes a front and a side, wherein the recess intersects the front and side.

Clause 12: The method of clause 11, wherein the fastening location of the cover body is a first upper fastening location and the fastening location on the pillar is a second upper fastening location, wherein the method includes fastening the first upper fastening location with the second upper fastening location.

Clause 13: The method of clause 12, further comprising fastening a first lower fastening location of the cover body with a second lower fastening location on the pillar for fastening the hinge cover in place with the door removed from the vehicle.

Clause 14: A kit comprising hinge covers that are sized and configured to cover door hinges of a vehicle with vehicle doors removed, the kit comprising: a first hinge cover comprising a first cover body sized and configured to cover a first door hinge of a vehicle such that the first cover body at least partially surrounds the door hinge when connected to a first pillar of the vehicle; and a second hinge cover comprising a second cover body sized and configured to cover a second door hinge of the vehicle such that the second cover body at least partially surrounds the second door hinge when connected to a second pillar of the vehicle.

Clause 15: The kit of clause 14, wherein the first cover body comprises a first fastening location that is located to align with a second fastening location on the first pillar for fastening the hinge cover in place with one of the vehicle doors removed from the vehicle.

Clause 16: The kit of clause 15, wherein the second cover body comprises a third fastening location that is located to align with a fourth fastening location on the second pillar for fastening the second hinge cover in place with another of the vehicle doors removed from the vehicle.

Clause 17: The kit of clause 15, wherein the first cover body has a first recess that forms the first fastening location of the first cover body and the second cover body has a second recess that forms the second fastening location of the second cover body.

Clause 18: The kit of clause 17, wherein the first cover body includes a front and a side, wherein the first recess intersects the front and side of the first cover body, and the second cover body includes a front and a side, wherein the second recess intersects the front and the side of the second cover body.

Clause 19: The kit of any of clauses 14-18, wherein the first door hinge is a first upper door hinge, the first cover body is sized and configured to cover the first upper door hinge and a first lower door hinge of the vehicle such that the first cover body at least partially surrounds the first upper door hinge and the first lower door hinge when connected to the first pillar of the vehicle.

Clause 20: The kit of claim 19, wherein the second door hinge is a second upper door hinge, the second cover body is sized and configured to cover the second upper door hinge and a second lower door hinge of the vehicle such that the second cover body at least partially surrounds the second upper door hinge and the second lower door hinge when connected to the second pillar of the vehicle.

What is claimed is:

1. A door hinge cover comprising:

a cover body sized and configured to cover at least one door hinge of a vehicle such that the cover body at least partially surrounds the at least one door hinge when connected to a pillar of the vehicle, the cover body comprising a fastening location that is located to align with a fastening location on the pillar for fastening the hinge cover in place with a door removed from the vehicle;

wherein the cover body is sized and configured to cover an upper door hinge and a lower door hinge of a vehicle such that the cover body at least partially surrounds the upper door hinge and the lower door hinge when connected to the pillar of the vehicle.

2. The door hinge cover of claim 1, wherein the cover body has a recess that forms the fastening location of the cover body.

3. The door hinge cover of claim 2, wherein the cover body includes a front and a side, wherein the recess intersects the front and side.

4. The door hinge cover of claim 3, wherein the fastening location of the cover body is a first upper fastening location and the fastening location on the pillar is a second upper fastening location, the first upper fastening location is located to align with the second upper fastening location.

5. The door hinge cover of claim 4, wherein the recess forms a first lower fastening location that is located to align with a second lower fastening location on the pillar for fastening the hinge cover in place with the door removed from the vehicle.

6. A method of covering a door hinge of a vehicle with a vehicle door removed, the method comprising:

covering at least one door hinge with a door hinge cover comprising a cover body sized and configured to cover the at least one door hinge of the vehicle such that the cover body at least partially surrounds the at least one door hinge when connected to a pillar of the vehicle, the cover body comprising a fastening location that is located to align with a fastening location on the pillar for fastening the hinge cover in place with a door removed from the vehicle; and fastening the door hinge cover to the pillar at the fastening location of the cover body and the fastening location on the pillar;

wherein the at least one door hinge is an upper door hinge, the cover body is sized and configured to cover the upper door hinge and a lower door hinge of the vehicle such that the cover body at least partially surrounding the upper door hinge and the lower door hinge when connected to the pillar of the vehicle.

7. The method of claim 6, wherein the fastening location on the pillar is provided by the at least one door hinge.

8. The method of claim 6, wherein the cover body has a recess forming the fastening location of the cover body.

9. The method of claim 8, wherein the cover body includes a front and a side, wherein the recess intersects the front and side.

10. The method of claim 9, wherein the fastening location of the cover body is a first upper fastening location and the fastening location on the pillar is a second upper fastening location, wherein the method includes fastening the first upper fastening location with the second upper fastening location.

11. The method of claim 10, further comprising fastening a first lower fastening location of the cover body with a second lower fastening location on the pillar for fastening the hinge cover in place with the door removed from the vehicle.

12. A kit for vehicle door assemblies, the kit comprising:

a first hinge cover comprising a first cover body sized and configured to cover a first door hinge of a vehicle such that the first cover body at least partially surrounds the first door hinge when connected to a first pillar of a vehicle; and a second hinge cover comprising a second cover body sized and configured to cover a second door hinge of the vehicle such that the second cover body at least partially surrounds the second door hinge when connected to a second pillar of the vehicle;

wherein the first door hinge is a first upper door hinge, the first cover body is sized and configured to cover the first upper door hinge and a first lower door hinge of the vehicle such that the first cover body at least partially surrounds the first upper door hinge and the first lower door hinge when connected to the first pillar of the vehicle.

13. The kit of claim 12, wherein the first cover body comprises a first fastening location that is located to align with a second fastening location on the first pillar for fastening the hinge cover in place with one of the vehicle doors removed from the vehicle.

14. The kit of claim 13, wherein the second cover body comprises a third fastening location that is located to align with a fourth fastening location on the second pillar for fastening the second hinge cover in place with another of the vehicle doors removed from the vehicle.

15. The kit of claim 13, wherein the first cover body has a first recess that forms the first fastening location of the first cover body and the second cover body has a second recess that forms the second fastening location of the second cover body.

16. The kit of claim 15, wherein the first cover body includes a front and a side, wherein the first recess intersects the front and side of the first cover body, and the second cover body includes a front and a side, wherein the second recess intersects the front and the side of the second cover body.

17. The kit of claim 12, wherein the second door hinge is a second upper door hinge, the second cover body is sized and configured to cover the second upper door hinge and a second lower door hinge of the vehicle such that the second cover body at least partially surrounds the second upper door hinge and the second lower door hinge when connected to the second pillar of the vehicle.

* * * * *